Patented Mar. 24, 1942

2,277,650

UNITED STATES PATENT OFFICE 2,277,650

PROCESS OF PRODUCING N-BUTYLENE

Martin Mueller-Cunradi, Ludwigshafen-on-the-Rhine, and Adolf Cantzler and Hans Krekeler, Mannheim, Germany, assignors, by mesne assignments to General Aniline & Film Corporation, New York, N. Y., a corporation of Delaware No Drawing. Application January 18, 1940, Serial No. 314,566. In Germany January 10, 1939

4 Claims. (Cl. 260—683)

This invention relates to a process of producing n-butylene.

While n-butylene has been prepared by dehydrogenating n-butane or by splitting off hydrogen chloride from monochlor-n-butane, very little has been done in preparing n-butylene from other starting materials. n-Butylene is of interest due to the possibility of its being used as a starting material for the production of butadiene-1,3 which is a raw material for the production of rubber.

We have now found that by exposing tertiary butyl chloride to temperatures at which hydrogen chloride is split off, an olefinic hydrocarbon is formed from which n-butylene may be recovered. We have also found that our method may likewise be applied to mixtures of iso-butylene and gaseous hydrogen chloride. The invention, accordingly, consists in the method of making n-butylene by exposing tertiary butyl chloride or mixtures of iso-butylene and hydrogen chloride to the action of high temperatures, and recovering from the olefinic hydrocarbon obtained n-butylene.

Broadly, our method consists in leading vaporized tertiary butyl chloride or a mixture of iso-butylene and hydrogen chloride through a vessel, preferably a tube or a plurality of tubes, heated to temperatures exceeding 400° C. The gaseous mixture emerging from the vessel is then subjected to a process by which n-butylene is separated from iso-butylene or tertiary butyl chloride. For example, the gaseous mixture is first cooled to normal temperature and subjected without further purification to the action of superatmospheric pressure or it may be cooled to temperatures below —30° C. or it may be cooled and compressed until at least part of the mixture is liquefied. Under these conditions the iso-butylene is converted into tertiary butyl chloride by the addition of hydrogen chloride, whereas the n-butylene remains unchanged. The gaseous mixture may also be led at moderately elevated temperatures over a catalyst promoting the addition of hydrogen chloride to tertiary olefines, for example according to a process as described in United States Patent No. 2,156,070. The unchanged gaseous n-butylene may then be easily separated from the liquid or liquefied tertiary butyl chloride and finally be freed from hydrogen chloride by washing with water.

In utilizing tertiary butyl chloride itself as starting material according to our invention, there is always obtained an amount of hydrogen chloride which is in excess to that equimolecular to the amount of iso-butylene formed. Accordingly, the iso-butylene contained in the exit gases may be converted completely into tertiary butyl chloride without adding further hydrogen chloride to the exit gases. Our invention, therefore, provides a means of continuously preparing n-butylene from tertiary butyl chloride by leading tertiary butyl chloride into a heated vessel, subjecting the gases emerging from the vessel to conditions under which tertiary butyl chloride is formed, separating it from n-butylene and hydrogen chloride and leading it back together with fresh tertiary butyl chloride into the heated vessel.

In general, the treatment of monochlorinated aliphatic hydrocarbons at high temperatures leads to the formation of the corresponding olefines and hydrogen chloride. It may, therefore, be assumed that according to our invention the primary reaction products are iso-butylene and hydrogen chloride and that under the influence of the hydrogen chloride the iso-butylene is converted partly into n-butylene. Our invention, therefore, may also be defined as consisting in the exposure of mixtures of iso-butylene and hydrogen chloride to high temperatures. As already mentioned, n-butylene is also formed according to our invention when starting from mixtures of iso-butylene and hydrogen chloride. We regard these mixtures as equivalents to tertiary butyl chloride. These mixtures may contain iso-butylene and hydrogen chloride in equimolecular proportions; they may even contain an excess of hydrogen chloride. The amount of n-butylene formed corresponds substantially to that formed in the high-temperature treatment of tertiary butyl chloride under otherwise identical conditions.

We may also use mixtures containing an excess of iso-butylene. In this case, the proportion of iso-butylene undergoing conversion is lessened, as the iso-butylene content of the starting mixture is increased. Mixtures of vaporized tertiary butyl chloride with iso-butylene and hydrogen chloride may also be used.

In carrying out the production of n-butylene, we have found that vessels or tubes made from iron, cast-steel, iron alloys or from ceramic materials may be used. The reaction temperature should exceed 400° C. and be preferably within the range of 500 to 650° C. Temperatures substantially exceeding 700° C. should be avoided in order to prevent the splitting of the carbon chain of the butylene.

Though the reaction may be carried out smoothly in empty vessels, we may use filler bodies or catalysts such as solid substances promoting the splitting off of hydrogen chloride, e. g. silica gel or active carbon, which may be impregnated with chlorides of polyvalent metals, for example of calcium, barium, magnesium or zinc. The reaction may also be carried out under reduced pressure or in the presence of inert diluents, such as nitrogen, carbon dioxide or in the presence of an excess of hydrogen chloride.

The tertiary butyl chloride or iso-butylene and hydrogen chloride may be preheated to approximately the temperatures at which the reaction sets in by a passage through any suitable preheater.

The following example is presented for the purpose of illustrating our invention. It is to be understood that the invention is not restricted to this particular example.

*Example*

545 grams of tertiary butyl chloride per hour are vaporized and led through a cast-iron tube of 45 millimeters internal diameter and of 1000 millimeters length which is charged with 1000 cubic centimeters of silica gel. The tube is heated to 550° C. The gases emerging from the catalyst are cooled to 80° below zero C., whereby about 545 grams of a liquid are obtained. The liquid is gently heated to normal temperature whereby a mixture of 63 grams of n-butylene and 40 grams of hydrogen chloride is evaporated. The mixture is washed with water thus isolating n-butylene. 442 grams of tertiary iso-butyl chloride remain in the condensate; they may again be passed through the heated tube.

A similar result is obtained when substituting a mixture of 332 grams of iso-butylene and 213 grams of hydrogen chloride per hour for 545 grams of tertiary butyl chloride.

What we claim is:

1. A process for the production of n-butylene which comprises exposing to temperatures exceeding 400° C. but not substantially exceeding 700° C. a gas selected from the group consisting of vaporized tertiary butyl chloride and mixtures of iso-butylene and hydrogen chloride, cooling the treated material and separating n-butylene from iso-butylene.

2. A process for the production of n-butylene which comprises exposing to temperatures exceeding 400° C. but not substantially exceeding 700° C. a gas selected from the group consisting of vaporized tertiary butyl chloride and mixtures of iso-butylene and hydrogen chloride, cooling the treated material to a temperature at which iso-butylene and hydrogen chloride form tertiary butyl chloride, and recovering n-butylene from tertiary butyl chloride and hydrogen chloride.

3. A process for the production of n-butylene which comprises exposing to temperatures exceeding 400° C. but not substantially exceeding 700° C. a gas selected from the group consisting of vaporized tertiary butyl chloride and mixtures of iso-butylene and hydrogen chloride, condensing the treated material, and recovering n-butylene from the condensate.

4. A process for the production of n-butylene which comprises exposing to temperatures exceeding 400° C. but not substantially exceeding 700° C. a gas selected from the group consisting of vaporized tertiary butyl chloride and mixtures of iso-butylene and hydrogen chloride in the presence of a solid catalyst promoting the splitting off of hydrogen chloride cooling the treated material to a temperature at which iso-butylene and hydrogen chloride form tertiary butyl chloride, and recovering n-butylene from tertiary butyl chloride and hydrogen chloride.

MARTIN MUELLER-CUNRADI.
ADOLF CANTZLER.
HANS KREKELER.